United States Patent
Ku et al.

(10) Patent No.: US 6,304,387 B1
(45) Date of Patent: Oct. 16, 2001

(54) METHOD OF PREDICTING THE CURVATURE RADIUS OF THE MICROLENS

(75) Inventors: Chi-Fa Ku, Hsinchu Hsien; Jeenh-Bang Yeh, Tainan, both of (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 09/574,475

(22) Filed: May 19, 2000

(30) Foreign Application Priority Data

Feb. 24, 2000 (TW) .............................................. 089103233

(51) Int. Cl.$^7$ .............................. G02B 3/00; G02B 9/06; B05D 5/06; C03B 19/01; B29D 11/00
(52) U.S. Cl. .......................... 359/642; 359/648; 359/664; 359/362; 427/164; 65/17.3; 264/1.32; 264/2.2
(58) Field of Search ...................................... 359/664, 642, 359/648, 362, 363; 356/6; 427/164; 65/17.3; 264/1.32, 2.2

(56) References Cited

U.S. PATENT DOCUMENTS 5,036,971 * 8/1991 Seden ..................................... 206/5.1

* cited by examiner

Primary Examiner—Georgia Epps
Assistant Examiner—Michael A. Lucas
(74) Attorney, Agent, or Firm—Thomas, Kayden, Horstemeyer & Risley, LLP

(57) ABSTRACT

The invention proposes a method of predicting the curvature radius of the microlens. By adjusting a spin speed of spin coating and exposure energy during a photolithography step, a volume of the patterned microlens material layer is controlled. Then a lens-forming step is performed to transform the patterned microlens material layer into a microlens. After measuring a diameter of the microlens, the volume of the microlens material layer is multiplied by a contraction coefficient to calculate a volume of the microlens. Then the diameter and the volume of the microlens are used to calculate a curvature radius.

10 Claims, 2 Drawing Sheets

METHOD OF PREDICTING THE CURVATURE RADIUS OF THE MICROLENS

CROSS-REFERENCE TO RELATED APPLICATION

This application claims the priority benefit of Taiwan application serial no. 89103233, filed Feb. 24, 2000.

BACKGROUND OF THE INVENTION

1. Field of Invention

The present invention relates to a microlens. More particularly, the present invention relates to a method of predicting the curvature radius of the microlens.

2. Description of Related Art

Microlens technology is now widely used in many optoelectronical products, for example, color digital cameras, endoscopes and color liquid crystal displays (LCD). The microlens is used to control the traveling directions of each light ray, so that the light can be precisely converged or diverged. Furthermore, through the control of digital devices, light and electricity can be interchanged digitally with each other.

For example, the converged digital camera is usually constituted by superimposing color filter arrays (CFA) either on a charge-coupled device (CCD) image sensor or on a complementary metal-oxide-semiconductor (CMOS) image sensor. In general, CFA contains three or more color filter channels arranged alternately, where each color filter channel only lets light with a specific frequency pass through, projecting to the corresponding image sensor. Therefore, the color of the image is interpreted by CFA, and then transferred to each corresponding sensor device for further processing. Furthermore, microlens arrays coupled with CFA can be used to focus the light rays, so that either the layout area of each sensor device on the substrate can be increased or the integrity can be raised.

Referring to FIG. 1, illustrating the cross-sectional view of the prior art structure containing the microlens and the sensor device, light-sensitive regions 12 are formed in a chip substrate 10. Sensor devices 14, for example, CCD or CMOS, are formed on the substrate 10. A planarized transparent layer 16 is formed on the substrate 10, with a CFA layer 18 formed thereon. Microlenses 20 are formed on the CFA layer 18, which refract light rays 22 coming from the outside to focus on the light-sensitive regions 12. Through the refraction of microlenses 20, light rays 22 are focused onto smaller areas in the light-sensitive regions 12, so that smaller areas are needed to form light-sensitive regions 12. Consequently, either the layout areas of sensor devices 14 can be increased or the integrity can be further raised.

For manufacturing the microlens in the prior art, a thermal process is usually performed to melt the patterned microlens material layer to form the microlens. In this way, it is difficult to obtain an important parameter, a curvature radius. In the past, the curvature radius was obtained by experience or by testing responses from the customers. The trial-and-error method is not only time-consuming but also imprecise.

SUMMARY OF THE INVENTION

The invention provides a method of predicting the curvature radius of the microlens through simple calculations, while using the easily adjustable process parameters, spin speed and exposure energy, for calculations. The predicted result is then used to control precisely the real curvature radius of the microlens.

The invention provides a method of predicting the curvature radius of the microlens. A substrate is provided. A microlens material layer is spin-coated on the substrate and a thickness of the microlens material layer is adjusted by controlling the spin speed for spin coating. A photolithography step is performed to pattern the microlens material layer with a first volume. A diameter of the patterned microlens material layer can be controlled by adjusting the exposure energy during the photolithography step. Then a lens-forming step is performed to transform the patterned microlens material layer into a microlens with a diameter and a second volume. After measuring the diameter of the microlens, the first volume multiplies with a contraction coefficient to calculate the second volume. The diameter and the second volume of the microlens are used to calculate the curvature radius.

The invention provides a method of predicting the curvature radius of the microlens, wherein the curvature radius can be predicted precisely because the process parameters, the spin speed and the exposure energy, can be accurately controlled. Consequently, the required standards can be reached readily by accurately controlling the process parameters.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 2A:
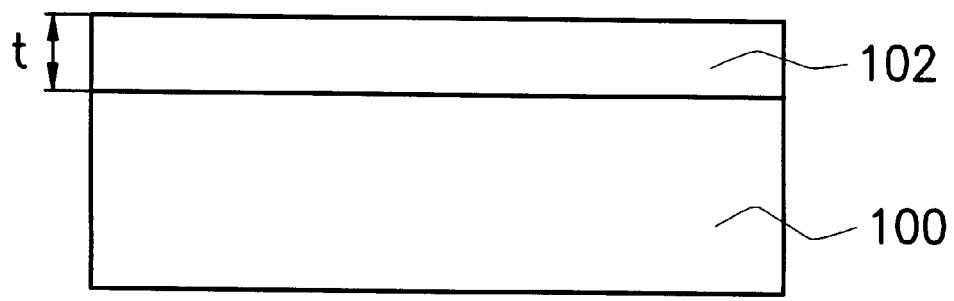
FIG. 2A to FIG. 2C are schematic, cross-sectional views illustrating the process steps for fabrication the microlens according to one preferred embodiment of this invention.

Referring to FIG. 2A, a chip substrate 100 is provided, and light-sensitive regions, sensor devices and a filter layer are already formed thereon (these elements not shown). The process steps for light-sensitive regions, sensor devices and the filter layer are not described here, since they are well known to persons familiar with the prior art.

A microlens material layer 102 is spin-coated on the substrate 100. A material for microlens material layer 102 can be, for example, a polystyrene resin or a polyimide resin. During spin coating, a spin speed can be adjusted to control accurately a forming thickness t of microlens material layer 102. The accuracy of the spin speed can be controlled to 1 rpm (revolutions per minute).

Figure 2B:
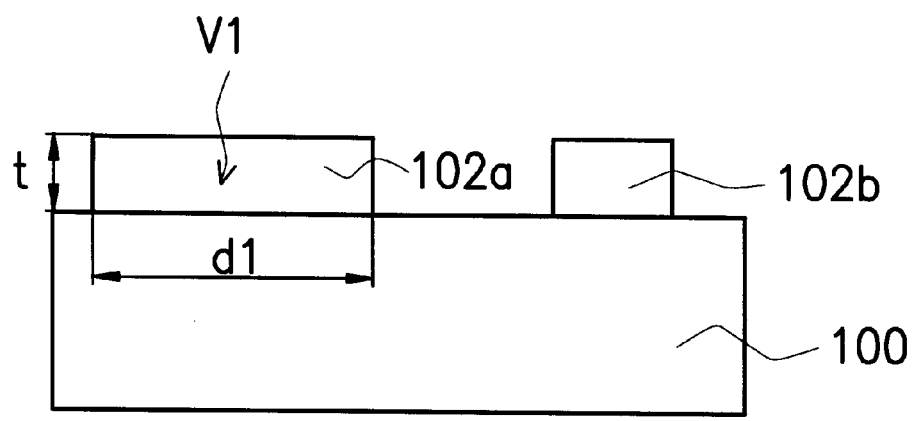

Referring to FIG. 2B, patterns of microlens arrays are defined by a photolithography step. In general, microlenses formed thereon are circular or elliptical. Taking the circular microlens for example, patterned microlens material layers 102a, 102b are formed after the photolithography step, which are to be used to form microlenses of different sizes.

By adjusting exposure energy during the exposure process, a forming area of the microlens, accordingly a diameter of the microlens, can be controlled to an accuracy of one percent.

The thickness and the diameter of the microlens material layers, and accordingly a volume of the microlens material layer, can be controlled accurately by adjusting precisely the spin speed of spin coating and the exposure energy during the exposure process. Taking microlens material layer 102a as an example, volume V1 of microlens material layer 102a can be calculated from the thickness t and the diameter d1 of the microlens material layer 102a.

Figure 2C:
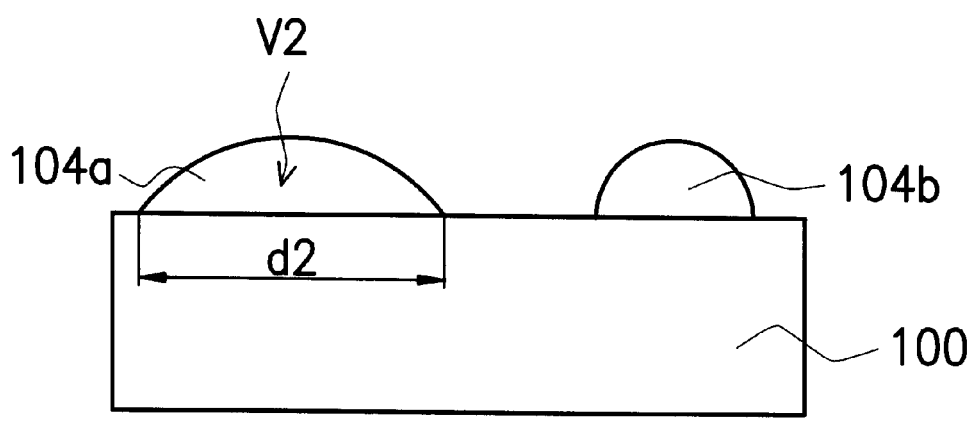

Referring to FIG. 2C, a lens-forming step is performed to form microlenses 104a, 104b, for example, a thermal process is performed to melt microlens material layer 102a, 102b, and to form microlenses 104a, 104b, through the contraction of cohesive force. Taking microlens 104a as a model, a diameter d2 can be measured by, for example, a laser. The volume V1 of microlens material layer 102a multiplies a contraction coefficient s to calculate a volume V2 of microlens 104a, V2=s×V1.

Figure 1:
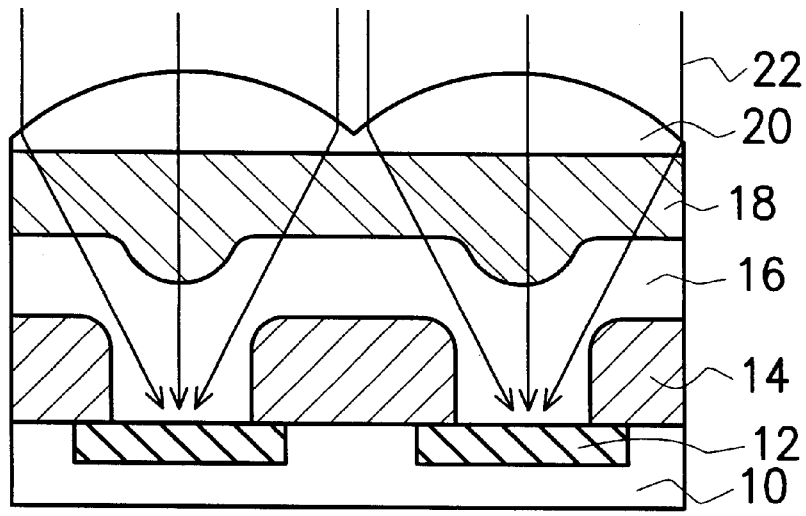
FIG. 1 illustrates the cross-sectional view of the prior art structure containing the microlens and the sensor device.
Figure 3:
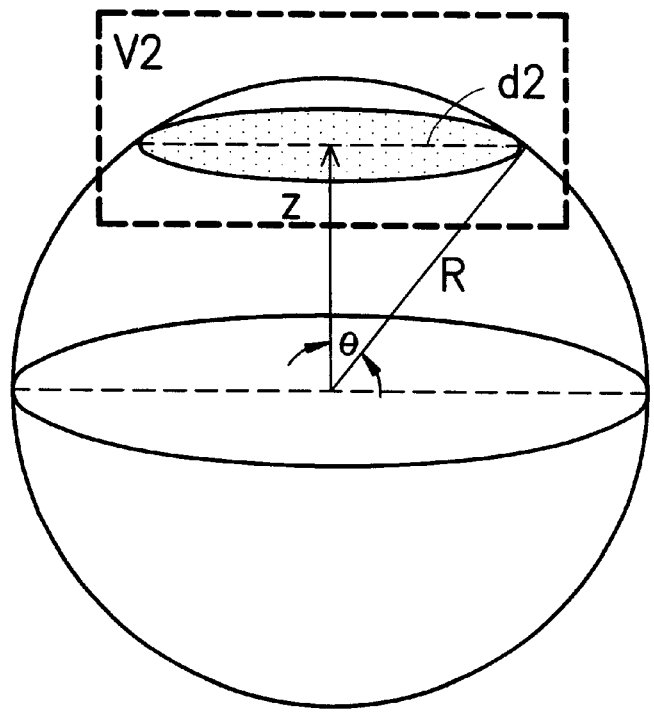
FIG. 3 illustrates the geometrical view of the relations between the volume, the diameter and the curvature radius.

Referring to FIG. 3, the diameter d2 and the volume V2 of microlens 104a are used as parameters to calculate a curvature radius R, a distance z between microlens 104a and the spherical center as well as an angle θ between R and z; the curvature radius R=f(d2, V2).

Taking a real model as an example for this invention, at first the microlens material layer is spin-coated with a spin speed of about 2600 rpm and a thickness t of around 1 micrometer ($\mu$m) is formed. Then the circular pattern is transferred to the microlens material layer after the exposure process, forming a circle with a diameter dl of about 3.80 micrometers. A lens-forming step is performed to form the microlens. The microlens is measured with a diameter d2 of about 4.10 micrometers, and then a volume V2 is calculated as around 9.07 $\mu m^3$. Therefore, a curvature radius can be calculated as around 2.32571 micrometers.

As embodied and described broadly herein, this invention predicts the curvature radius of the microlens over simple calculations, using the easily adjustable process parameters, the spin speed and the exposure energy for calculations. The predicted result is then used to control precisely the real curvature radius of the microlens.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of predicting a curvature radius of a microlens, wherein a substrate is provided; the method comprising:

forming a patterned microlens material layer with a first volume on the substrate;

performing a lens-forming step to transform the microlens material layer into a microlens with a second diameter and a second volume;

measuring the second diameter of the microlens;

multiplying the first volume by a contraction coefficient to calculate the second volume; and calculating the curvature radius from the second diameter and the second volume of the microlens.

2. The method as claimed in claim 1, wherein the method of forming the patterned microlens material layer comprises:

spin-coating a microlens material on the substrate to form a microlens material layer; and performing a photolithography step to transfer patterns to the microlens material layer.

3. The method as claimed in claim 2, wherein the patterned microlens material layer has a thickness and a first diameter, that are used then to calculate the first volume.

4. The method as claimed in claim 3, wherein the thickness of the microlens material layer is controlled by adjusting a spin speed of spin coating.

5. The method as claimed in claim 3, wherein the diameter of the microlens material layer is controlled by adjusting exposure energy during the photolithography step.

6. The method as claimed in claim 1, wherein the lens-forming step comprises a thermal process.

7. A method of predicting the curvature radius of the microlens, wherein a substrate is provided, the method comprising:

spin-coating a microlens material layer on the substrate;

performing a photolithography step to transfer patterns to the microlens material layer with a first volume;

performing a lens-forming step to transform the microlens material layer into a microlens with a second diameter and a second volume;

measuring the second diameter of the microlens;

multiplying the first volume by a contraction coefficient to calculate the second volume; and calculating a curvature radius from the second diameter and the second volume of the microlens.

8. The method as claimed in claim 7, wherein the thickness of the microlens material layer is controlled by adjusting a spin speed of spin coating.

9. The method as claimed in claim 7, wherein the diameter of the microlens material layer is controlled by adjusting an exposure energy during the photolithography step.

10. The method as claimed in claim 7, wherein the lens-forming step comprises a thermal process.

* * * * *